United States Patent [19]
Bopp et al.

[11] Patent Number: 4,768,637
[45] Date of Patent: * Sep. 6, 1988

[54] TORSION DAMPING ASSEMBLY

[75] Inventors: Warren G. Bopp, Farmington Hills; David A. Janson, Plymouth, both of Mich.

[73] Assignee: Eaton Corporation, Cleveland, Ohio

[*] Notice: The portion of the term of this patent subsequent to Sep. 1, 2004 has been disclaimed.

[21] Appl. No.: 73,618

[22] Filed: Jul. 13, 1987

Related U.S. Application Data

[60] Division of Ser. No. 771,373, Aug. 30, 1985, Pat. No. 4,690,256, which is a continuation-in-part of Ser. No. 734,440, May 16, 1985, abandoned.

[51] Int. Cl.[4] ............................. F16D 3/14; F16D 3/80
[52] U.S. Cl. ................................ 192/106.1; 192/3.21; 464/24; 464/57; 464/58
[58] Field of Search ................... 192/3.21, 3.28, 3.29, 192/3.3, 3.31, 3.32, 106.1, 106.2; 464/24, 25, 26, 27, 28, 57, 58, 59

[56] References Cited

U.S. PATENT DOCUMENTS

| | | | |
|---|---|---|---|
| 1,464,220 | 8/1923 | Sachs et al. | 464/26 |
| 1,630,737 | 5/1927 | Flanders | 464/24 |
| 3,653,228 | 4/1972 | Tiberio | 464/24 |
| 4,148,200 | 4/1979 | Schallhorn | 192/106.1 |
| 4,347,717 | 9/1982 | Lamarche | 192/106.1 |
| 4,351,167 | 9/1982 | Hanke et al. | 192/106.2 |
| 4,501,348 | 2/1985 | Lutz et al. | 464/24 |
| 4,565,273 | 1/1986 | Tojima et al. | 192/106.2 |
| 4,601,676 | 7/1986 | Tojima et al. | 464/24 |
| 4,690,256 | 9/1987 | Bopp et al. | 192/3.21 |

FOREIGN PATENT DOCUMENTS

| | | | |
|---|---|---|---|
| 1144067 | 2/1963 | Fed. Rep. of Germany | 464/26 |
| 3343940 | 6/1985 | Fed. Rep. of Germany | 464/24 |
| 3442738 | 6/1985 | Fed. Rep. of Germany | 464/24 |
| 159171 | 4/1957 | Sweden | 464/24 |
| 2022776 | 12/1979 | United Kingdom | 464/24 |
| 649903 | 2/1979 | U.S.S.R. | |

Primary Examiner—Leslie A. Braun
Assistant Examiner—David A. Testardi
Attorney, Agent, or Firm—P. S. Rulon

[57] ABSTRACT

An assembly (19) for damping torsionals in a vehicle driveline. Assembly (19) includes a spring assembly (20) and a vane damper assembly (22) disposed in parallel and immersed in automatic transmission fluid of a torque converter housing (24). The spring assembly (20) isolates driveline torsionals and the damper assembly dissipates the torsionals. The damper assembly (22) includes first and second relatively rotatable housing members (66,68) respectively connected to the spring assembly output (62b) and input (62a). Members (66,68) are also frictionally interconnected by surfaces (68a,74a). Housing members (66,68) define chambers (78a,78b) containing the transmission fluid and which vary inversely in volume in response to flexing of the spring assembly (20) by the driveline torsionals. As the chambers vary in volume, energy from the torsionals is converted to fluid pressure in the chambers decreasing in volume. The pressure increases the engagement force of the friction surfaces and the pressure is dissipated across restricted passages.

4 Claims, 8 Drawing Sheets

TORSION DAMPING ASSEMBLY

This application is a division of application Ser. No. 771,373, filed 08-30-85, now U.S. Pat. No. 4,690,256, which is a continuation in part of application Ser. No. 734,440, filed May 16, 1985, now abandoned.

CROSS REFERENCE TO RELATED APPLICATION

This application is related to U.S. patent application Ser. No. 564,537, filed Dec. 22, 1983, which is assigned to the assignee of this application and which is incorporated herein by reference.

BACKGROUND OF THE INVENTION

This invention relates to driveline torsion damping mechanisms operable over the entire operational range of a driveline. More specifically, the invention relates to such mechanisms for vehicle drivelines.

It is well-known that the speed of an Otto or Diesel engine output or crankshaft varies even during so-called steady-state operation of the engine, i.e., the shaft continuously accelerates and decelerates about the average speed of the shaft. The accelerations and decelerations are, of course for the most part, a result of power pulses from the engine cylinders. The pulses may be of uniform frequency and amplitude when cylinder charge density, air/fuel ratio, and ignition are uniform. However, such uniformity does not always occur, thereby producing pulses which vary substantially in frequency and amplitude. Whether uniform or not, the pulses, which are herein referred to as torsionals, are transmitted through vehicle drivelines and to passengers in vehicles. The torsionals, which manifest themselves as vibrations, are detrimental to drivelines and derogate passenger-ride quality. Further, when an engine is abruptly accelerated and/or decelerated by accelerator pedal movement or other factors, torque pulses ring through the driveline and also derogate ride quality, such pulses are herein also referred to as torsionals.

Since the inception of the automobile, many torsion damping devices or schemes have been proposed and used to isolate and dampen driveline torsionals. For example, master clutches, used in combination with mechanical transmissions, have long employed springs and secondary mechanical friction devices to respectively isolate and dampen torsionals. Typically, torsionals are isolated or absorbed by a plurality of circumferentially spaced, coil springs disposed in parallel between the master clutch primary friction input and splined output. Damping is provided by secondary mechanical friction surfaces disposed in parallel with the springs and biased together with a predetermined force. Damping occurs when the amplitude of the torsionals exceeds the breakaway or slip torque of the secondary friction surfaces. With this arrangement, portions of the torsionals less than the slip torque of the secondary friction surfaces are transmitted directly through the clutch without flexing or isolation by the springs, i.e., the arrangement provides neither torsion isolation nor damping. If the slip torque of the secondary friction surfaces is reduced by design or wear of the secondary surfaces, damping is reduced. Further, any portions of the torsionals greater than the spring energy absorption or storage capacity are also transmitted directly through the clutch. If the spring rate is increased to provide greater storage capacity and prevent spring collapse, the springs transmit lesser amplitude torsionals directly through with little or no effective isolation or absorption of the torsionals.

To increase the operational spring range and storage capacity of a torsion damping assembly, Wemp in U.S. Pat. No. 1,978,922, proposed using a low spring rate torsion sleeve capable of flexing substantially more than the coil springs used with master clutches. This arrangement, like the master clutch arrangement, also employs secondary mechanical friction surfaces disposed in parallel and biased together with a predetermined force to provide damping. Hence, the Wemp arrangement also fails to provide isolation and damping of torsionals below the slip or breakaway torque of the secondary friction surfaces. The Wemp arrangement is also underdamped if the slip or breakaway torque of the secondary friction surfaces is reduced.

The advent of torque converter-type automatic transsissions ushered in a whole new perception of torsion damping and, of course, passenger ride quality. While torque converters have many advantages, one being torsional damping, they embody inherent slip and, therefore, inherent losses in vehicle fuel economy. In an effort to minimize this slippage and thereby optimize or improve fuel economy, various efforts have been made to bypass the torque converter with some manner of direct drive which is typically brought into play when a vehicle is operating in the higher speed ratios of the transmission. While these direct-drive bypass arrangements have resulted in fuel economy improvement, they have also brought back driveline vibration with resultant derogation in the vehicle ride quality that passengers have become accustomed to over the years. The direct drive bypasses, for the most part, have been in the form of master type friction clutches with torsion damping devices similar to the previously mentioned devices. One example of such a bypass is disclosed in U.S. Pat. No. 4,194,604. Two further examples of bypass drives are disclosed in U.S. Pat. Nos. 3,977,502 and 4,317,510. In the '502 patent, the master type clutch engagement force is such that the clutch primary friction surface continuously slips or slips in response to torsionals above a predetermined amount. This arrangement is difficult to control since the engagement force must vary with driveline torque. In the '510 patent, the master clutch incorporates a viscous coupling which continuously slips to dampen torsionals in a manner analogous to the continously slipping clutch in the '502 patent. With the arrangement in both of these patents, substantially all of the energy from the engine to the transmission must be transmitted across slipping surfaces; hence, both arrangements generate substantial amounts of heat and, of course, losses in the form of fuel economy. A third bypass arrangement, as disclosed in U.S. Pat. No. 4,138,003, includes the master type clutch in combination with low-rate torsion isolation springs which may be of the helical torsion type or of the torsion bar type analogous to the arrangement disclosed in previously mentioned U.S. Pat. No. 1,978,922. It is also known to use flat torsion springs in vibration dampers, as diclosed in U.S. Pat. No. 4,181,208.

Previously mentioned copending U.S. application Ser. No. 564,537, entitled Torsion Damping Assembly, discloses the use of a viscous coupling in lieu of the secondary mechanical friction surfaces used in the prior art torsional damping mechanisms. Since the clutching medium therein is a viscous silicone liquid, such as dimethylpolysiloxane, breakaway torque associated with the mechanical friction surfaces is eliminated. Hence, the coupling provides damping over the entire operational or torque range of the assembly. The coupling has a constant damping factor and has provided excellent results in tested vehicles. However, when the assembly is employed to bypass a torque converter of an automatic transmission and is installed within the torque converter housing, the assembly is immersed in the pressurized automatic transmission fluid used by the torque converter. Hence, there is risk of mixing the viscous silicone liquid of the viscous coupling with the automatic transmission fluid and vice versa.

SUMMARY OF THE INVENTION

An object of the present invention is to provide a torsion damping assembly which is effective to isolate and dampen driveline torsionals over substantially the entire operational range of the driveline and which employs fluid pressure to damp the driveline torsionals.

Another object of the present invention is to provide such an assembly immersed in automatic transmission fluid in a torque converter housing of an automatic transmission and employing the automatic transmission fluid to damp the driveline torsionals.

Another object of the present invention is to provide such an assembly which increases damping in response to the rate of change of the torsionals.

According to a feature of the present invention, the torsion damping assembly includes a torsional energy isolating means and damping means adapted for parallel connection between rotatable input and output drives of a driveline, the isolating means being operative to resiliently transmit driveline torque between the drives and allow limited relative rotation of the drives in response to torsionals in the driveline torque; the improvement comprises: a vane damper defining the damping means, the damper including first and second housing members disposed for relative rotation about a common axis in response to relative rotation of the drives and defining an annular compartment concentric to the axis, one of the members fixed for rotation with one of the drives and the other member adapted for substantially fixed driving connection with the other drive, the annular compartment divided into at least two variable volume chambers by first and second vanes radially disposed across the annular compartment and respectively fixed to the first and second housing members, the chambers vary inversely in volume in response to the torsionals, the variable volume chambers filled with an incompressible fluid which increases in pressure in response to the associated chamber tending to decrease in volume, and means allowing restricted flow of the fluid from a chamber decreasing in volume and flow of the fluid into a chamber increasing in volume.

According to another feature of the present invention, a transmission includes a housing assembly having a variable speed ratio section disposed therein between input and output drives rotatably supported by the housing, a transmission oil for lubricating the ratio section and a torsion damping assembly; the damping assembly including torsional energy isolating means and torsional energy damping means connected in parallel with each other, and the isolating and damping means being connected in series between one of the drives and the ratio section when operative; the isolating means including resilient means for transmitting torque between the one drive and the ratio section and for allowing limited relative rotation between the one drive and the ratio section in response to torsionals in the torque; the torsional energy damping means disposed within a compartment defined by the housing assembly and immersed within pressurized transmission oil; the improvement comprising:

an expandable chamber mechanism defining the damping means, the mechanism including first and second housing members having wall surfaces defining at least two chambers filled with transmission oil, the chambers varying inversely in volume in response to the relative rotation between the one drive and the ratio section, whereby the pressure of the oil in the decreasing volume increases, and means allowing restricted flow of the oil from a chamber decreasing in volume while allowing a flow of the oil into a chamber increasing in volume.

According to another feature of the invention, friction means are provided to inhibit the relative rotation and the frictional force increases with the magnitude of the torsionals.

BRIEF DESCRIPTION OF THE DRAWINGS

The torsion damping assembly of the present invention is shown in the accompanying drawings in which:

FIG. 5 is a graph schematically illustrating the spring rate characteristics of the torsion damping assembly in FIGS. 1-4;

DETAILED DESCRIPTION OF THE DRAWINGS

Figure 1:
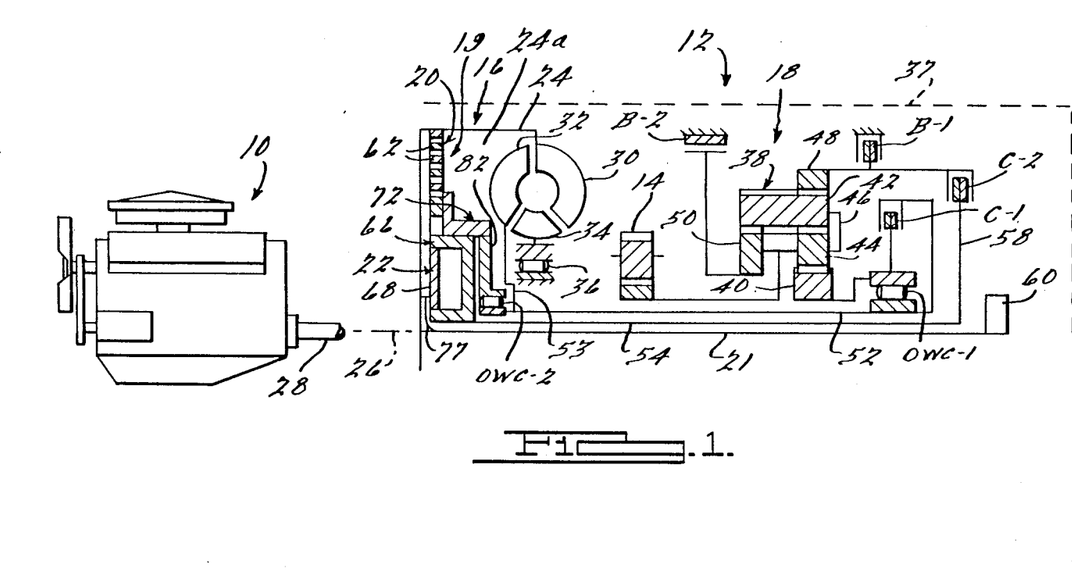
FIG. 1 is a schematic view of a portion of a motor vehicle driveline including the torsion damping assembly of the present invention.

The motor vehicle driveline, seen schematically in FIG. 1, includes an internal combustion engine 10 and an automatic transmission 12 having an output drive or gear 14 for driving a load such as unshown rear and/or front wheels of a vehicle.

The transmission 12 comprises a hydrokinetic fluid coupling or torque converter assembly 16, a ratio section 18, and a torsion damping assembly 19 including a spring assembly 20 and a vane damper assembly 22. Components 16-22 are substantially symmetrical about a rotational axis defined by a shaft 21 of the transmission and are shown only above the axis for simplicity and brevity.

Torque converter assembly 16 is disposed within a torque converter housing 24 rotationally driven by an input drive 26 connected directly to a crankshaft 28 of the engine in any of several well-known manners. Converter assembly 16 may be of any well-known type and includes an impeller 30 driven by housing 24, a turbine 32 driven hydrokinetically by the impeller, and a stator 34 connectable by a one-way roller clutch 36 to a ground such as a non-rotatable portion of the transmission housing represented by phantom lines 37. Torque converter housing 24 is filled with an incompressible fluid or transmission oil which is commonly referred to as automatic transmission fluid (ATF), which lubricates the ratio section 18, and which is often pressurized in the torque converter housing 24.

Transmission 12 is a modified form of the generally known class of split input torque transmissions disclosed in U.S. Pat. No. 4,398,436 and published British Patent Application No. 2,099,091A, both of which are incorporated herein by reference. Ratio section 18 comprises a planetary gear set 38 controlled by friction clutches C-1 and C-2, one-way clutch OWC-1, and brakes B-1 and B-2 to provide a reverse and three forward speed ratio modes of operation. Planetary gear set 38 includes a first sun gear 40, first and second sets of planetary gears 42, 44 supported by a common planet carrier 46, a ring gear 48, and a second sun gear 50. Sun gear 40 is connectable to a first quill or torque converter driven shaft 52 via clutch C-1 or clutch OWC-1. Shaft 52 is in turn connected to turbine 32 via a radially extending member 53. The first and second sets of planetary gears are respectively in constant mesh with each other, with sun gears 40 and 50, and with ring gear 48. Planetary carrier 46 is in constant or direct driving relation with output gear 14. Ring gear 48 is connectable to ground via brake B-1 or to a second quill shaft 54 via clutch C-2. Shaft 54 is connected at its left end to the vane damper 22 and at its right end to clutch C-2 via a radially extending flange or spider 58. Sun gear 50 is in constant mesh with planetary gears 42 and is connected to ground via brake B-2. Ratio section 18 further includes an oil pump 60 driven by shaft 21 for pressurizing the ATF.

Figure 2:
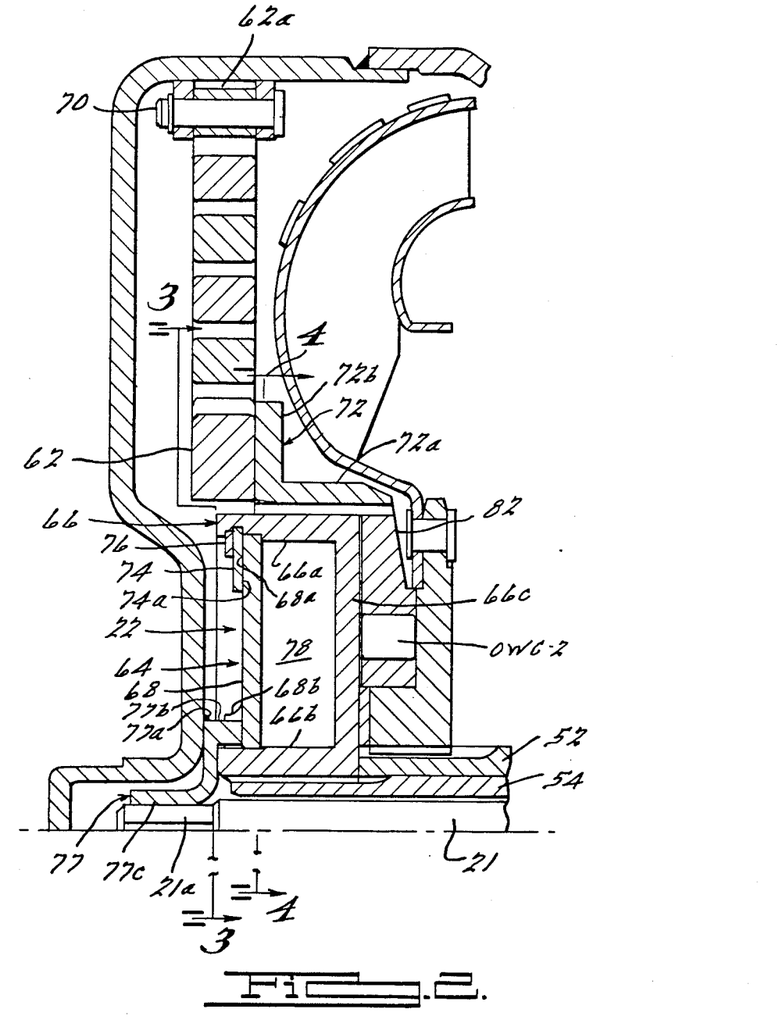
FIG. 2 is a partial, detailed, sectional view of the transmission of FIG. 1 with the torsion damping assembly also shown in detail.
Figure 3:
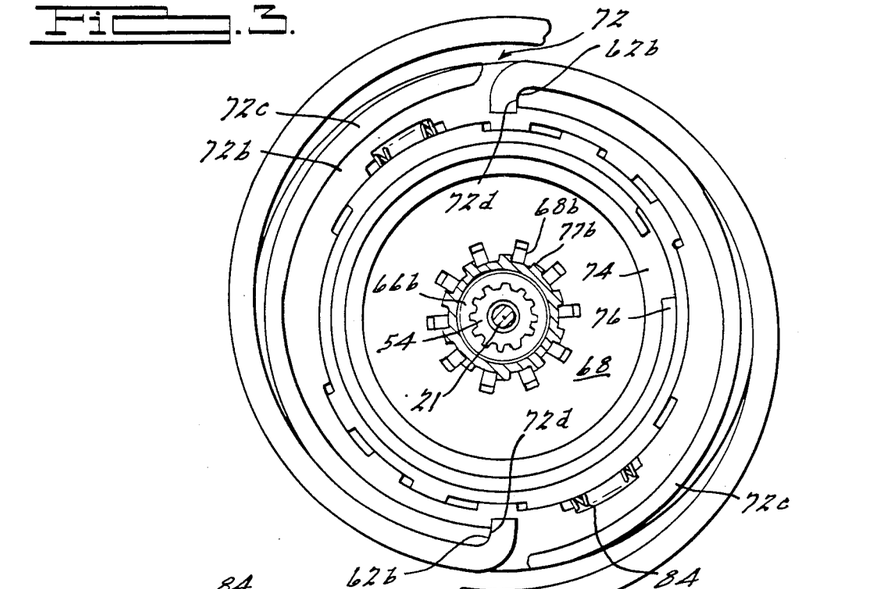
FIG. 3 is a partial, elevational view of the torsion damping assembly in relief and looking along line 3—3 of FIG. 2.
Figure 4:
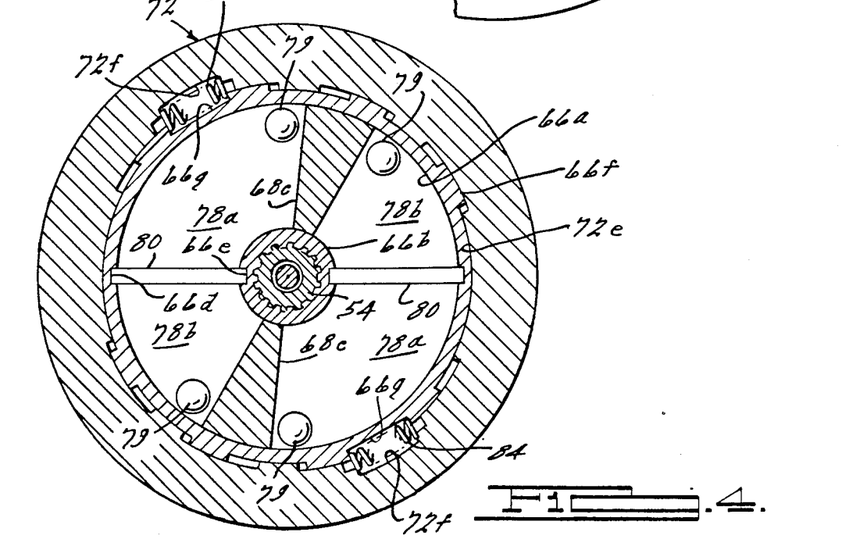
FIG. 4 is a partial, sectional view of a vane damper in the torsion damping assembly looking along line 4—4 of FIG. 2.

Looking now at the schematic representation of the torsion damping assembly 19 in FIG. 1 and in the more detailed illustration in FIGS. 2-4, assembly 19 is disposed within an annular compartment 24a defined by torque converter housing 24. Assembly 19 is immersed within the pressurized oil in compartment 24a. Spring assembly 20 includes two interdigitated, flat, torsion springs 62. Vane damper assembly 22 includes an annular housing assembly 64 having first and second relatively rotatable housing members 66, 68.

Springs 62 are pivotally fixed at their radially outer ends 62a to torque converter housing 24 by pins 70 disposed 180 degrees apart; only one end 62a and one pin 70 are shown in the drawings. Radially inner ends 62b of springs 62 are drivingly connected or hooked to an annular bracket 72. Bracket 72 includes a cylindrical or axially extending leg 72a, a radially extending leg 72b, and a pair of scroll-like flanges 72c extending axially from leg 72b. The scroll-like flanges are visible only in FIG. 3. Ends 62b of springs 62 hook over ends 72d of flanges 72c to effect the driving connection therebetween. Flanges 72c also radially support springs 62.

Member 66 includes axially extending cylindrical wall portions 66a, 66b and a radially extending wall portion 66c. Member 68 includes a radially extending wall disposed within the cylindrical walls 66a, 66b and retained therein by an annular thrust member 74 and a snap ring 76. The interface 68a, 74a of housing member 68 and thrust member 74 may be a bearing-like surface to minimize friction. However, the interface, preferably, frictionally interacts to provide a secondary torsion damping which increases in magnitude with increasing driveline torsionals, as explained in further detail herein after. Member 68 is fixed to torque converter housing 24 by a bracket 77 welded at 77a to housing 24. Bracket 77 includes a plurality of radially extending teeth or splines 77b which mate with teeth or splines 68b projecting axially from member 68. Bracket 77 also includes a hexagonal opening 77c at its center which receives a hexagonal end 21a of pump shaft 21. Members 66, 68 define an annular compartment 78 containing oil from or of the type in torque converter compartment 24a. As may be seen in FIG. 4, damper compartment 78 is divided into pairs of variable volume chambers 78a, 78b by pairs of partitions or vanes 80, 68c which respectively extend radially across the compartment. Vanes 80 are fixed to member 66 via axially extending grooves 66d, 66e in the cylindrically inner and outer surfaces of cylindrical walls 66a, 66b. Vanes 68c are integrally framed with member 68 and extend axially therefrom into compartment 78. Housing member 66 is connected directly to external splines on quill shaft 54 via mating internal splines on cylindrical wall 66b. Housing member 66 and bracket 72 are drivingly interconnected for limited relative rotation via external splines 66f on cylindrical wall 66 and internal splines 72e on cylindrical leg 72a of the bracket. Bracket 72 is also connected to the outer race of a one-way clutch OWC-2 by a radially extending portion 82 of the race. The inner race of OWC-2 is fixed to turbine 32 and quill shaft 52. Splines 66f, 72e are circumferentially biased apart by a pair of helical compression springs 84 disposed in pairs of recesses 66g, 72f respectively defined by member 66 and bracket 72.

Springs 62 and 84 provide torsion damping assembly 19 with two spring rates as schematically illustrated in FIG. 5. Springs 84 provide a relatively low spring rate represented by low slope curve A when the driveline torque is below a predetermined amount and a substantially greater spring rate represented by higher slope curves B when the driveline torque is above the predetermined amount.

Figure 6:
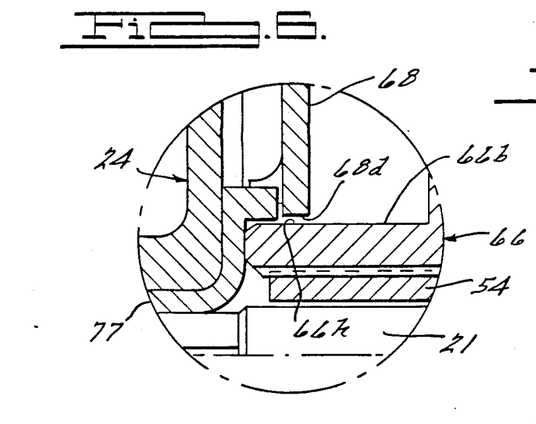
FIGS. 6-9 illustrate various sealing and valving arrangements for the vane damper.
Figure 7:
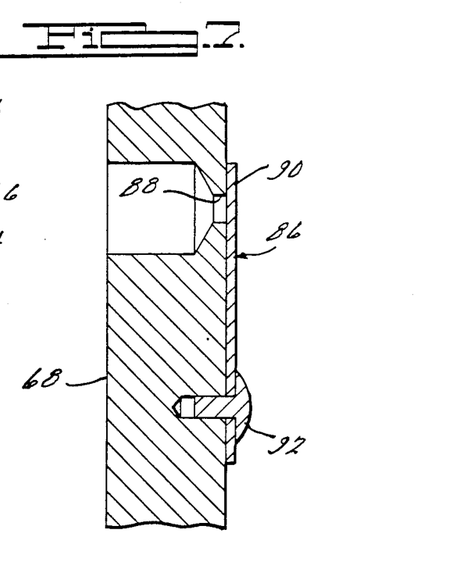
Figure 8:
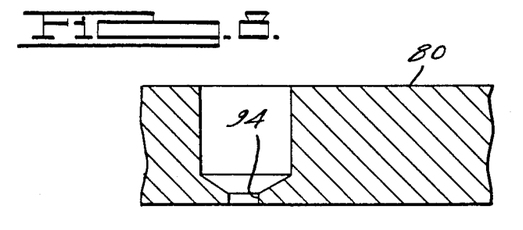
Figure 9:
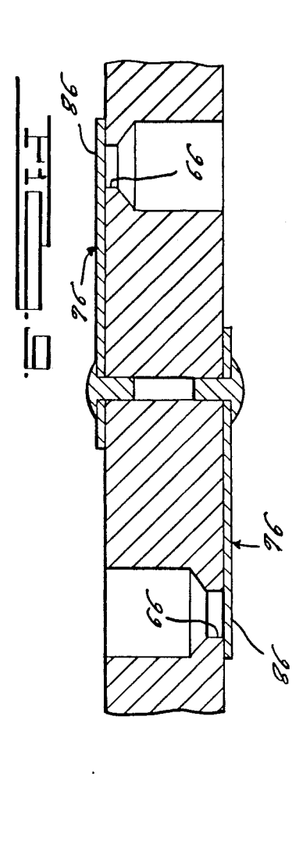

Sealing and valving for variable volume chambers 78a, 78b of damper 22 may be provided in several ways. Preferably, the chambers are in restricted communication with the pressurized fluid in torque converter compartment 24a to ensure fluid fill of the chambers. Such restricted communications may be via a passage(s) in the wall(s) of members 66, 68, by controlled spacing of adjacent surface portions 66h, 68d of members 66, 68 as illustrated in FIG. 6, or by one-way valves 86 in housing member 68 of FIG. 7. Valves 86 comprise an orifice 88 defined by housing member 68 and sealed against out flow of fluid by a light force leaf spring 90 fixed to the housing member by a fastener 92. Restricted flow of fluid from a chamber decreasing in volume to a chamber increasing in volume may be provided in a manner analogous to FIG. 6 or, as illustrated in FIG. 8, via an orifice or orifices 94 in the vanes. Orifices 94 may be in vanes 80 and are preferably structured to minimize sensitivity to viscosity changes of the oil. Chambers 78a, 78b may be provided with blow-off valves to prevent over pressurizing of the chambers in response to abnormally high torsionals. FIG. 9 illustrates such blow-off valves in the form of one-way valves 96 constructed in a manner similar to valves 86 of FIG. 7 but having leaf springs 98 of substantially greater force and orifices 99 of greater flow area.

Figure 10:
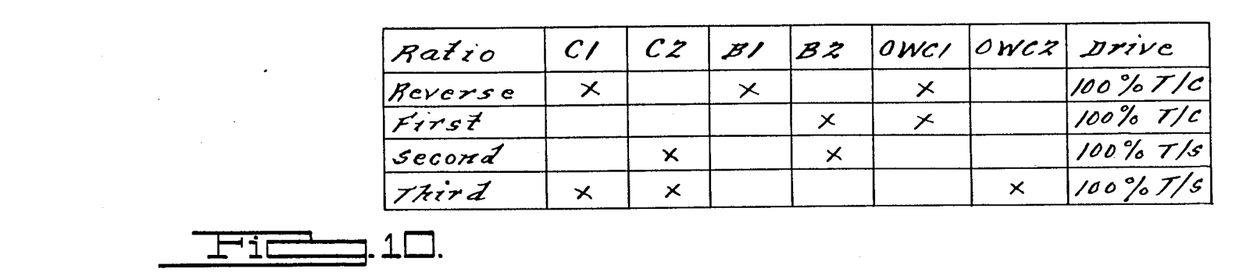
FIG. 10 is a chart showing clutch and brake engagement for shifting the transmission of FIG. 1.

Operation of transmission 12 is in accordance with the FIG. 10 chart showing clutch and brake engagements to effect the reverse and forward speed ratio modes of operation. In first and reverse, 100% of driveline torque is transmitted to the ratio section via the torque converter (T/C). In second and third, 100% of the driveline torque is transmitted via torsion spring assembly (T/S)20. When the transmission is in third, clutch OWC-2 engages to provide a torque reaction for sun gear 40. While the transmission is in either second or third, driveline torsionals emanating from the engine are isolated by the torsion spring assembly 20 and are damped by the shock absorbing or energy dissipating action of damper assembly 22 and by the variable friction forces at interfaces 68a, 74a of members 68, 74. For example, when torsionals cause a sudden relative rotation of first and second housing members 66, 68 such that chambers 78a decrease in volume and chambers 78b increase in volume, the energy in the torsionals is converted to an increase in the pressure of the oil in chambers 78a and somewhat of a decrease in the pressure of the oil in chambers 78b. The pressure increases are proportional to the rate of change of the torsionals and are greater than the pressure decreases. The pressure energy damps the torsionals in two ways, i.e., by increasing the engagement force of friction faces 68a, 74a and by flow through the restricted passages in FIGS. 6-9. The damping or energy dissipation occurs independent of the steady-state torque in the driveline and independent of the magnitude of the torsionals since the energy dissipated in forcing the oil through the restricted passages is always proportional to the magnitude of the torsionals. Elastomeric balls or bumpers 79 in chambers 78a, 78b prevent contact of vanes 68c, 80.

Figure 11:
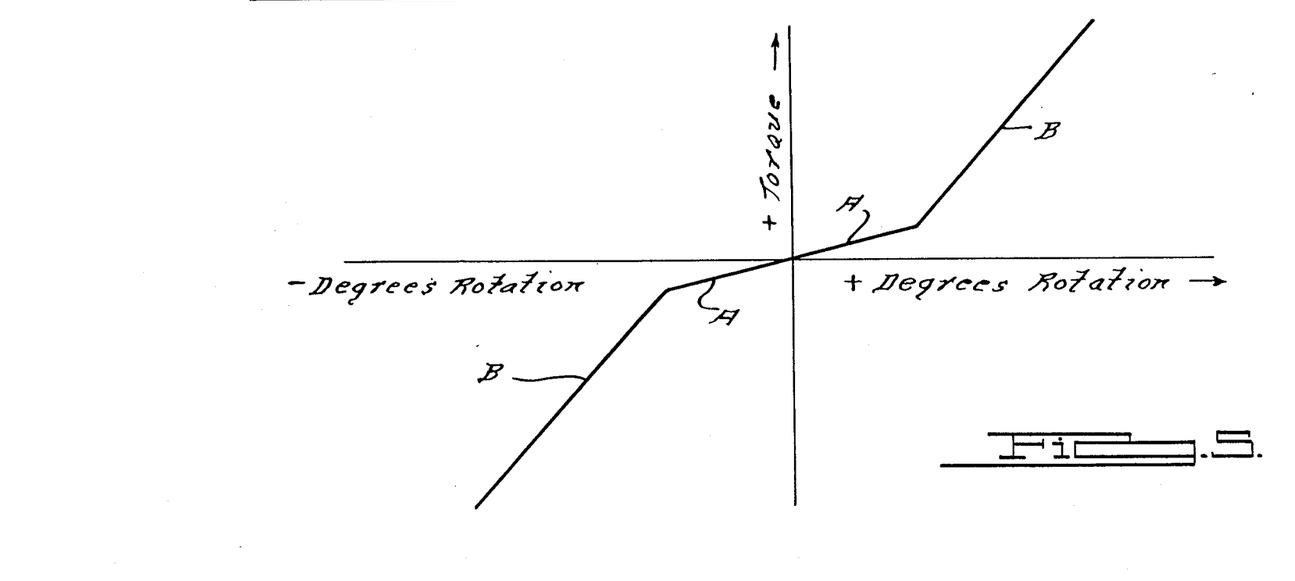
FIG. 11 is a modified embodiment of the torsion damping assembly.

Looking now at the modified embodiment of FIG. 11, therein elements which are substantially identical to elements in the previously described figures will be identified with the same reference numerals suffixed with a prime. The torsion damping assembly 100 of FIG. 11 embraces the principles of the damping assembly 19 but is modified to be frictionally clutched to the torque converter housing 24' to effect bypass of the torque converter to a shaft 104 which is normally driven by the torque converter turbine 32' via the member 53'. The modification consists mainly of the addition of a clutch plate 106, a cylindrical extension of 108 the inner cylindrical wall 66b' of the damper assembly 22'. Clutch plate 106 includes a radially extending portion 106a having an axially extending hub portion 106b at its radially inner edge and a U-like flange portion 106c at its radially outer edge. The inner surface of hub portion 106b is in sliding contact with an O-ring seal 109 disposed in a groove 104a of shaft 104. The U-like flange portion 106c is connected to the radially outer ends 62a' of springs 62' by pins 70'. Clutch plate 106 includes an annular friction lining 110 bonded thereto and frictionally engagable with a confronting surface 111 of the torque converter housing. Clutch plate 106 also includes a set of axially extending teeth 106d which mesh with teeth 68b' of second housing member 68' and which do not allow limited relative rotation therebetween as in the previously described embodiment. The inner surface of cylindrical extension 108 is slidably splined to the outer surface of a hub portion 53a of member 53'. Clutch plate 106 divides torque converter chambers 24a' into two chambers, a chamber 112 between the clutch plate and the radially extending portion of the torque converter housing, and a chamber 114 between the clutch plate and the torque converter.

During non-bypass operation of the torque converter in FIG. 11, pressurized transmission oil is admitted to the torque converter via chamber 112. The oil in chamber 112 prevents frictional engagement of the friction lining 110 with surface 111. The oil thus flows radially outward in chamber 112 past lining 110 and into chamber 114 for flow to the torque converter. When it is desired to engage torsion damping assembly 100, as, for example, when the vehicle is operating in a higher gear ratio and above a predetermined vehicle speed, the direction of flow of the pressurized oil is reversed by actuation of a suitable valve, not shown. Specifically, the pressurized oil is now admitted to chamber 114 where it acts against the radially extending portion 106a of clutch plate 106 and slides the entire damping assembly to the left to frictionally engage lining 110 with surface 111. Driveline torque now bypasses the torque converter and is transmitted to shaft 104 via the damping assembly. Since clutch plate 106 is not normally engaged when the engine is at idle, torsion damping assembly 100 does not require driving connections which suppress idle rattle. Hence, the loose spline connections to the outer periphery of the housing member 66 and to housing member 68 for suppression of idle rattle are not needed.

Figure 12:
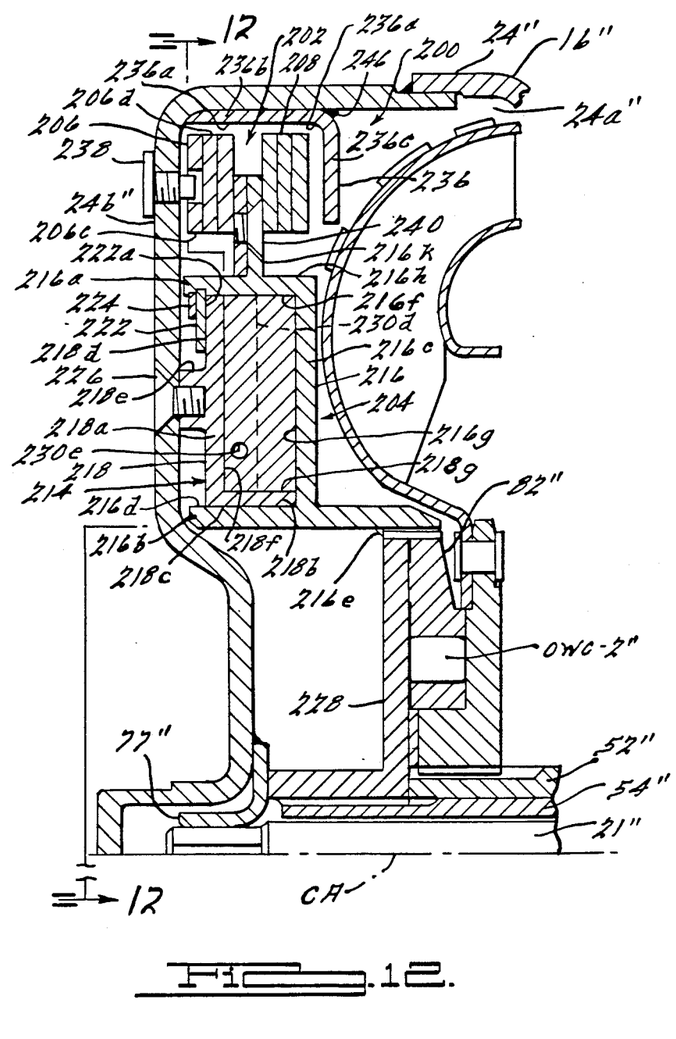
FIG. 12 illustrates a second modified embodiment of the torsion damping assembly.
Figure 13:
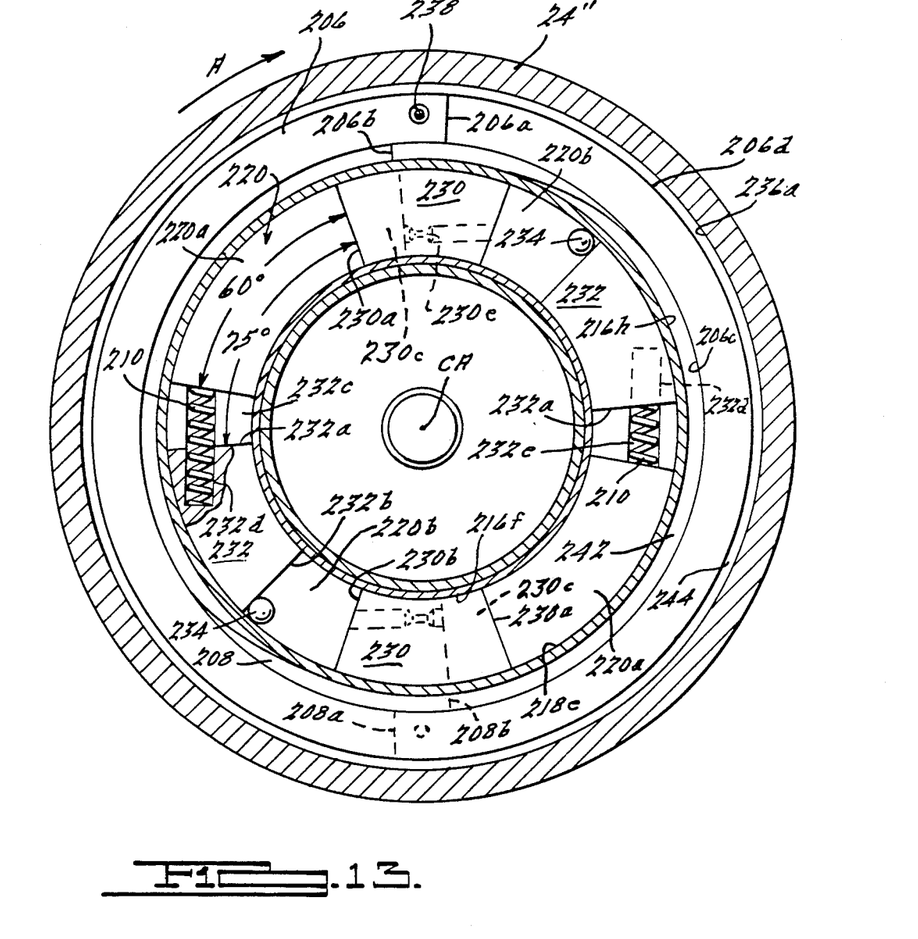
FIG. 13 is a partial, sectional view of torsion damping assembly of FIG. 12 looking along line 12—12 off in FIG. 12.

Looking now at the modified embodiment of FIGS. 12 and 13, therein elements, which are substantially identical to elements in FIGS. 1 and 2, will be identified with the same reference numerals suffixed with a double prime. Torsion damping assembly 200 of FIGS. 12 and 13 embraces the basic principles of damping assemblies 19 and 100. Assembly 200 includes a torsion isolating spring assembly 202 operative to transmit driveline torque between relatively rotatable input and output drives such as torque converter housing 24" and the transmission ratio section in a manner analogous to spring assembly 20. Assembly 200 also includes a vane damper assembly 204 connected in parallel across the spring assembly to dampen torsionals in response to relative rotation of the drives caused by driveline torsionals effecting flexing of the spring assembly relative to the vane assembly. The spring and damper assemblies are disposed to rotation about a common axis CA. Spring assembly 202 includes a pair of helically wound torsion springs 206, 208 which require substantially less radial space than the spiral torsion springs 62 of spring assembly 20. Vane damper assembly 204, though analogous to damper assembly 22, differs structurally in that its inner and outer diameters are substantially greater and in that it may internally include torsion isolating springs 210 disposed in parallel with spring assembly 202 for increasing the effective torsion isolating spring rate of the damper assembly in response to relative rotation of the input and output drives beyond a predetermined amount. The greater diameters of damper assembly 204 facilitates increasing the volumetric displacement of the damper assembly and also facilitates using the damper assembly with either the one-way overrunning clutch OWC-2" or a torque splitter unit such as disclosed in U.S. Pat. No. 4,398,436. Alternatively, damper assembly 204 may be placed radially outward of spring assembly 202, thereby further increasing the diameter and/or volumetric displacement of the damper assembly.

Assembly 200 is immersed within pressurized transmission oil in a compartment 24a" defined by torque converter assembly 16". Damper assembly 204 includes an annular housing assembly 214 having first and second relatively rotatable housing members 216, 218 defining an annular compartment 220 in fluid communication with the oil in compartment 24a". Housing member 216 includes radially spaced, axially extending, cylindrical wall portions 216a, 216b and a radially extending wall portion 216c. Housing member 218 includes a radially extending wall portion 218a closing the axially facing opening in housing member 216 and an axially extending, cylindrical wall portion 218b having a radially inner surface 218c journaled on a radially outer surface 216d of wall portion 216b. The elongated, cylindrical interface between wall portions 216b, 218b reduces wear therebetween and reduces oil communication between compartments 24a" and 220 for a given radial spacing between the surfaces 216d, 218c. Oil communication between the compartments may be further reduced in other ways, e.g., one of the surfaces may be provided with annular grooves to form a labyrinth type seal. The radially outer edge of wall portion 218a may be provided with a wall portion similar to wall portion 218b. Wall portion 218a is retained by an annular thrust member 222 and a snap ring 224. The interface 218d, 222a of wall portion 218a and thrust member 222 may be a bearing-like surface to minimize friction or may frictionally interact as previously described with respect to torsion assembly 19. Wall portion 218a includes a plurality of circumferentially spaced bosses 218e for securing housing member 218 to a radially extending wall portion 24b" of torque converter housing 24" by fasteners such as countersink screws 226. The radially inner surface of cylindrical wall portion 216b includes internal splines 216e defining an output drive for drivingly connecting housing number 216 to a quill shaft 54" via an annular member 228 in a manner analogous to the way housing member 66 is connected in FIG. 2. In a like manner, splines 216e connect housing member 216 to an outer race portion 82" of one-way clutch OWC-2".

As previously mentioned, housing members 216, 218 define an annular compartment 220. As may be seen in FIG. 13, compartment 220 is divided into pairs of variable volume chambers 220a, 220b by pairs of partitions or vanes 230, 232 which respectively extend radially and axially across the compartment. Chambers 220a decrease in arc lengthen in response to increasing torque and torsionals in the driving mode direction of arrow A. Chambers 220b decrease in arc length in response torque and torsionals in the coast made direction opposite of arrow A. Vanes 230 are fixed to housing member 216 by unshown fasteners such as screws and vanes 232 are fixed to housing member 218 in an analogous manner. Vanes 230 are in sliding-sealing contact with adjacent surfaces 218f, 218g housing member 218 and vanes 232 are in sliding-sealing contact with surfaces 216f, 216g of housing member 216. The circumferential length of chambers 220a is defined by circumferentially facing ends 230a, 232a of the vanes and in a like manner the circumferential length of chambers 220b is defined by circumferential facing ends 230b, 232b of the vanes. When the damper vanes are in a neutral or central position, chambers 220a are 75° in length and chambers 220b are 25° in length. However, the circumferential lengths of the chambers are readily changed to suit the driveline requirements. Elastomeric balls or bumpers 234 in chambers 220b prevent contact of vane ends 230b, 232b and limit the maximum volume change of chamber 220b to about 20°. Vanes 232a include a stepped portion 232c extending 15° beyond end 232a and a chordally disposed bore 232d extending into the or horizontal portion of the step to define a trough 232e having spring 210 disposed therein. Springs 210 may be retained in bores 232d in any of several conventional ways. Vanes 230 each include a stepped portion or 15° undercut recess 230c which receives the mating stepped portion 232c of vanes 232 when relative rotation of the vanes exceeds 60°. A vertically extending phantom line 230d in vane 230 of FIG. 12 represents the run surface of undercut recess 230c. Springs 210 are compressed by ends 230a of vanes 230 as steps 232c are received in undercut portions 230c. Springs 210 are disposed in parallel with springs 206, 208 since springs 210 react between vanes 230, 232 and since vanes 230, 232 are respectively fixed to housing member 216 and torque converter housing 24". End walls 230b, 232b of vanes 230, 232 may be stepped and provided with springs in a manner analogous to the steps of end walls 230a, 232a and springs 210. Chambers 220a 220b are filled with transmission fluid from compartment 24a" as previously described. Chambers 222a, 220b may be intercommunicated by restricted passages 230e in vanes 230 or as previously described.

Spring assembly 202, which as an assembly is serially connected between torque converter housing 24" and housing member 216, includes the helically wound springs 206, 208 disposed in parallel with respect to each other, and radially inner and outer circumferential surfaces 216h, 236a for limiting radial contraction and expansion of the springs as they wind and unwind due to driveline torque and torsionals. Spring 206 includes ends 206a, 206b which are axially aligned with each other at the top most position in FIGS. 12 and 13 when not under load. Spring 208 includes ends 208a, 208b which are also circumferentially disposed next to each other but 180° from the ends of spring 206, as shown by phantom lines at the bottom of FIG. 13. The springs are basically mirror images of each other and are secured to housings 24", 216 in the same manner. Hence, a description of one spring should suffice for both. Spring ends 206a, 206b are pivotally connected, respectively, to housing 24" by a screw fastener 238 and to a radially extending flange portion 216k of housing member 216 by a screw fastener 240. Spring 206 has three full winds or coils formed of spring steel having a rectangular cross-section with a height to width of 5 to 1. The coils form inner and outer circumferential surfaces 206c, 206d which vary radially or in diameter as the coils wind and unwind. A radial distance 242 between spring surface 206c and housing member surface 216h limits flexing or contracting of spring 206 in the winding direction to about 75°. During the first 60° of flexing, springs 206, 208 transmit all steady state driveline torque between input drive 24" and output drive 216e; thereafter, springs 210 in the vane damper come into play and share driveline torque. A radial distance 244 between spring surface 206d and surface 236a limits flexing or expansion of spring 206 in the unwinding direction to about 20°. Surface 236a is defined by an axially extending wall portion 236b of an annular bracket 236 welded at 246 to torque converter housing 24". Surface 236a may be defined by the circumferential surface of torque converter housing 24". A radially extending wall portion 236c of bracket 236 and radially extending wall portion 24b" of torque converter housing 24" axially retain springs 206, 208 for preventing axial disengagement of spring end 206a from fastener 238 in wall portion 24b" and from the unshown fastener pivotally securing spring end 208b to a wall portion 236c of bracket 236.

While the embodiments of the present invention have been illustrated and described in detail, it will be apparent that various changes and modifications may be made in the disclosed embodiments without departing from the scope or spirit of the invention. The appended claims are intended to cover these and other modifications believed to be within the spirit of the invention.

What is claimed is:

1. In an assembly including torsional energy isolating means and damping means adapted for parallel connection between rotatable input and output drives of a driveline, the isolating means being operative to resiliently transmit driveline torque between the drives and allow limited relative rotation of the drives in response to torsionals in the driveline torque, the improvement comprising:

a vane damper defining the damping means, said damper including first and second housing members disposed for relative rotation about a common axis in response to relative rotation of the drives and defining an annular compartment concentric to the axis, one of said members fixed for rotation with one of the drives and the other member adapted for substantially fixed driving connection with the other drive, said annular compartment divided into at least two variable volume chambers by first and second vanes radially disposed across the annular compartment and respectively fixed to the first and second housing members, said chambers varying inversely in volume in response to the torsionals, said variable volume chambers filled with an incompressible fluid, and means allowing restricted flow of the fluid from a chamber decreasing in volume and a flow of the fluid into a chamber increasing in volume; and means operative to provide a friction force for inhibiting the relative rotation of said first and second housing members, and said means being operative to increase the frictional force in response to increasing pressure in said chambers.

2. An assembly including torsional energy isolating means and damping means adapted for parallel connection between rotatable input and output driver of a driveline; the isolating means being operative to resiliently transmit driveline torque between the drives and allow limited relative rotation of the drives in response to torsionals in the driveline torque; the damping means including means operative to increase the pressure of a fluid in response to the relative rotation; the improvement comprising:

means operative to engage mechanical friction means for inhibiting the relative rotation in response to the fluid pressure being increased by said relative rotation.

3. The assembly of claim 2, wherein said damping means includes at least one chamber varied in volume in response to said relative rotation, and containing said fluid, the pressure of the fluid in the chamber increased in response to said relative rotation decreasing the volume of the chamber.

4. The assembly of claim 2, wherein said damping means comprises:

a vane damper including first and second housing members disposed for relative rotation about a common axis in response to relative rotation of the drives, the housing member defining an annular compartment divided into at least two inversely variable volume chambers by first and second vanes radially disposed across the annular compartment and respectively fixed to the first and second housing members, said chambers containing the fluid and inversely variable in volume in response to said relative rotation for increasing the pressure of the fluid in the chamber decreasing in volume, said housing members each defining an exterior and axially facing end wall of the compartment, one of said housing members supporting thrust means including friction means exterior to said compartment and reacting fluid pressure forces on the end wall of the other housing member for limiting relative axial movement of said end walls and for frictionally interconnecting said housing members.

* * * * *